G. W. KELLOGG.
PRESSURE GAGE.
APPLICATION FILED NOV. 4, 1911.

1,043,439.

Patented Nov. 5, 1912.

Inventor
George W. Kellogg

Witnesses
His Attorneys

UNITED STATES PATENT OFFICE.

GEORGE W. KELLOGG, OF ROCHESTER, NEW YORK.

PRESSURE-GAGE.

1,043,439.         Specification of Letters Patent.     Patented Nov. 5, 1912.

Application filed November 4, 1911.   Serial No. 658,507.

*To all whom it may concern:*

Be it known that I, GEORGE W. KELLOGG, of Rochester, in the county of Monroe and State of New York, have invented certain new and useful Improvements in Pressure-Gages; and I do hereby declare the following to be a full, clear, and exact description of the same, reference being had to the accompanying drawings, forming a part of this specification, and to the reference-numerals marked thereon.

The present invention relates to pressure gages, being particularly adapted to that class of devices employed for determining the air pressure within pneumatic tires, and it has for its object to provide a construction having a novel arrangement of parts whereby the device is compact, and neat in appearance, the manner of operation being extremely simple and accurate.

To these and other ends the invention consists in certain improvements and combinations of parts all as will be hereinafter more fully described, the novel features being pointed out in the claims at the end of the specification.

Figure 1:
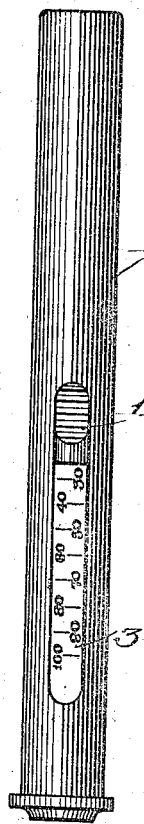
Figure 2:
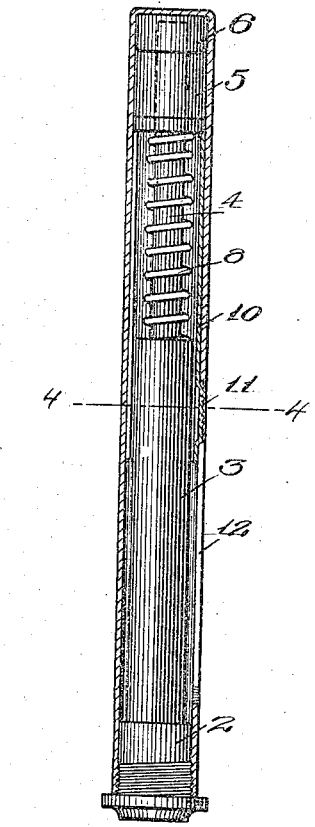
Figure 3:
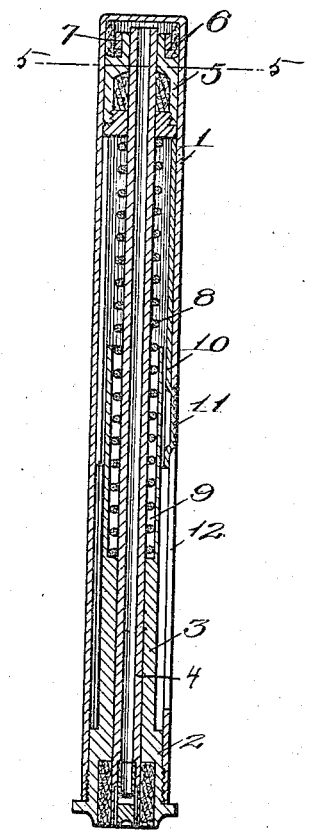
Figures 4, 6:
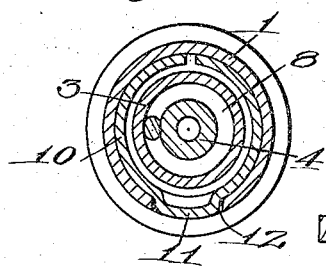
Figure 5:
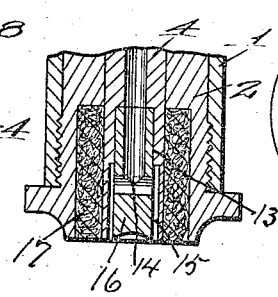

In the drawings: Figure 1 is a view in elevation, of a gage embodying my improvements; Fig. 2 is a longitudinal sectional view of the outer casing, showing the inner casing, and its coöperating parts, in elevation; Fig. 3 is a longitudinal sectional view; Fig. 4 is a transverse sectional view on the line 4—4 of Fig. 2. Fig. 5 is a transverse sectional view on the line 5—5 of Fig. 2, and Fig. 6 is an enlarged detail view of the lower portion of Fig. 3.

Similar reference numerals throughout the several figures indicate the same parts.

The invention, as illustrated in the present embodiment, comprises an outer casing 1, closed at its upper end, and having threaded engagement at its lower end with the coupling 2, the latter being provided with an upwardly extending sleeve 3, within which is secured the inner casing 4, which preferably extends to a point slightly below the top of the outer casing, as shown in Fig. 3.

The coupling 2 may be attached to the valve of the tire in the usual manner of this class of devices, the air passing upwardly through the inner casing 4 and outwardly at the top thereof, and it is necessary to provide a member adapted to be moved relatively to the casings, by the pressure of air, to effect operation of the indicator. To this end, in the present embodiment, I provide a piston 5 which is hollow and surrounds the inner casing 4, being provided at its upper end with a rubber gasket 6 attached in any suitable manner as by a clamping ring 7, and arranged to engage closely the wall of the outer casing. The piston 5 may be held in its normal, or uppermost position, in any desirable manner, and to this end, in the present embodiment, there is provided a compression spring 8 surrounding the inner casing and seated at its lower end in a recess 9 of the sleeve 3, the spring having engagement at its upper end with the piston 5.

The piston 5 is arranged to engage an indicator in its downward movement, which latter is carried to the lowermost position reached by the piston, or to the position indicating the pressure within the tire, and remains in such position after the piston has been returned to its normal position by the spring 8, and to this end, there is provided an indicator comprising preferably a split sleeve 10 arranged within the outer casing 1 and in frictional engagement with the walls thereof. The sleeve 10 carries a corrugated finger piece 11, which projects through the slot 12, provided in the outer casing 1, and constitutes an index, or indicator, suitable graduations being arranged on the sleeve 3 adjacent to the slot, which coöperate with the indicator 11 to afford the desired reading.

The inner casing 4 is provided near its lower end with an interiorly formed shoulder to receive the tubular member 13, which is preferably driven into the inner casing. The member 13 has a transverse opening 14 connecting with the passage 15 which surrounds the lower portion of the tubular member, and the lower end of the tubular member 13 is formed solid as at 16, affording a projection which engages the valve stem in the tire and opens the valve when the gage is applied, as usual in this class of devices. A suitable packing ring 17 of soft rubber or other yieldable material is arranged about the lower end of the inner casing, and affords an air-tight joint when the gage is in use.

The operation of my invention, briefly, is as follows: Upon attaching the device to the valve of a pneumatic tire, the valve being thereby opened, the air pressure enters through the inner casing 4 and acts against the upper face of piston 5 forcing the same downwardly against the action of the spring 8. In its downward movement, the piston 5 engages the upper edge of the sleeve 10, carrying the latter also downwardly until the pressure of the air and the resistance of the spring 8 are balanced, or equalized. Upon the removal of the device from the tire, the piston 5 returns to its normal position under the influence of spring 8, but the sleeve 10 remains at the point to which it has been moved by the piston, thus serving to give an accurate and readily determinable reading of the pressure existing within the tire. When it is to be used again, the indicator may be moved to normal position by a slight pressure of the thumb against the thumb piece 11, until the latter engages the upper end of slot 12.

While I have shown a preferred embodiment of my invention, I do not limit myself to the exact construction and arrangement of parts herein disclosed, for the invention is susceptible of various modifications without departing from the essential features thereof which comprehends an outer casing closed at the top, and an indicator adapted to be moved within said casing to show the amount of pressure being determined.

I claim as my invention:

1. In a pressure gage, the combination with an outer casing having a closed end, of an inner casing arranged in spaced relation to the outer casing and communicating therewith near the closed end of the latter, a piston surrounding the inner casing, a spring arranged between the casings, said spring being supported at one end and engaging the piston at the other end to hold the same normally at the closed end of the outer casing, said outer casing having an opening therein, and an indicator arranged for movement in the opening and adapted to be engaged and moved by the piston.

2. In a pressure gage, the combination with an outer casing having a closed end, of an inner casing arranged in spaced relation to the outer casing and communicating therewith near the closed end of the latter, a piston surrounding the inner casing, a spring arranged between the casings, said spring being supported at one end and engaging the piston at the other end to hold the same normally at the closed end of the outer casing, said outer casing having an opening therein, a sleeve within the outer casing having frictional engagement therewith, and an indicator carried by the sleeve, the latter being arranged for engagement with and movement by the piston.

3. In a pressure gage, the combination with an outer casing having a closed end, of an inner casing arranged in spaced relation to the outer casing and communicating therewith near the closed end of the latter, a piston surrounding the inner casing, retarding means arranged in the path of movement of the piston, a sleeve frictionally supported within the outer casing and adapted to be engaged and moved by the piston, said outer casing having an opening therein, and an indicator carried by the sleeve and visible within the opening.

4. In a pressure gage, the combination with an outer casing having a closed end, of an inner casing arranged in spaced relation to the outer casing and communicating therewith near the closed end of the latter, a piston surrounding the inner casing, retarding means arranged in the path of movement of the piston and holding the same normally at the closed end of the outer casing, the outer casing having an opening therein, and an indicator visible within the opening and adapted to be held frictionally within the outer casing and to be engaged and moved by the piston.

5. In a pressure gage, the combination with an outer casing having a closed end, of an inner casing arranged in spaced relation to the outer casing and communicating therewith near the closed end of the latter, a piston surrounding the inner casing at one end, a sleeve surrounding the opposite end of the inner casing, a spring surrounding the intermediate portion of the inner casing and arranged between the piston and the sleeve, and an indicator held frictionally within the outer casing and adapted to be engaged and moved by the piston, said outer casing having an opening within which the indicator moves, and said sleeve being provided with graduations for coöperation with the indicator.

6. In a pressure gage, the combination with an outer casing having a closed end, of an inner casing arranged in spaced relation to the outer casing and communicating therewith near the closed end of the latter, a piston surrounding the inner casing, retarding means arranged in the path of movement of the piston to hold the same normally at the closed end of the casing, the outer casing having an opening, and an indicator visible in said opening and arranged to be moved by the piston.

GEORGE W. KELLOGG.

Witnesses:
RUSSELL B. GRIFFITH,
H. E. STONEBRAKER.

Copies of this patent may be obtained for five cents each, by addressing the "Commissioner of Patents, Washington, D. C."